United States Patent
Shalon

(10) Patent No.: US 12,219,975 B1
(45) Date of Patent: *Feb. 11, 2025

(54) HYBRID MEAT PRODUCT AND METHOD OF PRODUCTION

(71) Applicant: Tidhar Shalon, Los Altos Hills, CA (US)

(72) Inventor: Tidhar Shalon, Los Altos Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,373

(22) Filed: Oct. 3, 2023

Related U.S. Application Data

(63) Continuation of application No. 16/484,457, filed on Aug. 8, 2019, now Pat. No. 11,832,636.

(51) Int. Cl.
| | |
|---|---|
| *A23L 13/60* | (2016.01) |
| *A23L 5/10* | (2016.01) |
| *A23L 13/40* | (2023.01) |
| *A23L 13/50* | (2016.01) |

(52) U.S. Cl.
CPC .......... *A23L 13/60* (2016.08); *A23L 5/10* (2016.08); *A23L 13/424* (2016.08); *A23L 13/426* (2016.08); *A23L 13/52* (2016.08)

(58) Field of Classification Search
CPC ........ A23L 13/40; A23L 13/432; A23L 33/16; A23L 13/67; A23L 13/52; A23L 13/43
USPC ....................................................... 426/644
See application file for complete search history.

(56) References Cited

U.S. PATENT DOCUMENTS

| | | |
|---|---|---|
| 2004/0043133 A1 | 3/2004 | Crider, III et al. |
| 2007/0269567 A1 | 11/2007 | McMindes et al. |
| 2015/0305390 A1 | 10/2015 | Vrljic et al. |
| 2016/0000129 A1 | 1/2016 | Gold |
| 2021/0282435 A1 | 9/2021 | Shalon |

FOREIGN PATENT DOCUMENTS

| | | |
|---|---|---|
| CN | 102771805 A | 11/2012 |
| CN | 105050426 A | 11/2015 |
| WO | WO-9422325 A1 | 10/1994 |
| WO | WO-9903359 A1 | 1/1999 |
| WO | WO-2008054189 A1 | 5/2008 |
| WO | WO-2014110532 A2 | 7/2014 |
| WO | WO-2014110539 A1 | 7/2014 |
| WO | WO-2015153666 A1 | 10/2015 |
| WO | WO-2018152137 A1 | 8/2018 |

OTHER PUBLICATIONS

Calkins et al. Ranking of Beef Muscles for Tenderness. National Cattleman's Beef Association (2007). Retrieved Nov. 5, 2021 at URL: https://rawtruthaboutbeef.com/wp-content/uploads/2020/01/Ranking-Of-Beef-Muscles-for-Tenderness.pdf. 6 pages.
Cross et al. Developing a Heme Iron Database for Meats According to Meat Type, Cooking Method and Doneness Level. Food and Nutrition Sciences, 2012, 3, 905-913. Published Online Jul. 2012.
EP18754657.7 Extended European Search Report dated Nov. 4, 2020.

(Continued)

*Primary Examiner* — Subbalakshmi Prakash
(74) *Attorney, Agent, or Firm* — Ashok Tankha

(57) ABSTRACT

A beef-like hybrid meat product combining two families of animal is provided, along with methods of producing the beef-like hybrid meat product.

12 Claims, 1 Drawing Sheet

(56) References Cited

OTHER PUBLICATIONS

Frozen Chicken Cordon Bleu. Mintel Global New Products Database (GNPD). [Online.] Oct. 2013. Record ID: 2189734. 3 pages.
Hedrick, et al., eds. Principles of Meat Science, 4th ed., Chapter 5, pp. 91-107 (2001).
Lyon et al. Texture Evaluations of Cooked, Diced Broiler Breast Samples by Sensory and Mechanical Methods. Poultry Science, vol. 75, pp. 813-819 (1996).
Macleod et al. The effect of heat on beef aroma: Comparisons of chemical composition and sensory properties. Flavour and Fragrance Journal, vol. 1, pp. 91-104 (1986).
Meat Flavored Adult Dog Food. Mintel Global New Products Database (GNPD). [Online.] May 2016. Record ID: 3943481. 3 pages.
Min et al. Factors in Various Fractions of Meat Homogenates That Affect the Oxidative Stability of Raw Chicken Breast and Beef Loin. Journal of Food Science, vol. 74, Nr. 1, pp. C41-C48 (2009). Copyright 2008 Institute of Food Technologists.
Ofori, et al. Chapter 13: The Use of Blood and Derived Products as Food Additives, p. 229. In Food Additive, El-Samgray, ed., IntechOpen (2012). Retrieved Nov. 10, 2021 from URL: https://www.academia.edu/download/48004216/Food_Additive-_livro_com_capitulo_xilitol.pdf#page=241. 30 pages.
PCT/US2018/018080 International Search Report and Written Opinion dated Jun. 7, 2018.
Stew Filled Ravioli. Mintel Global New Products Database (GNPD). [Online.] Feb. 2012. Record ID: 1725369. 3 pages.
U.S. Appl. No. 16/484,457 Notice of Allowance dated Sep. 20, 2023.
U.S. Appl. No. 16/484,457 Office Action dated Aug. 5, 2021.
U.S. Appl. No. 16/484,457 Office Action dated Mar. 31, 2022.
U.S. Appl. No. 16/484,457 Office Action dated May 25, 2023.
U.S. Appl. No. 16/484,457 Office Action dated Nov. 10, 2022.
Zhuang et al. Variation and Pearson correlation coefficients of Warner-Bratzler shear force measurements within broiler breast fillets. Poultry Science, vol. 88, pp. 214-220 (2009).

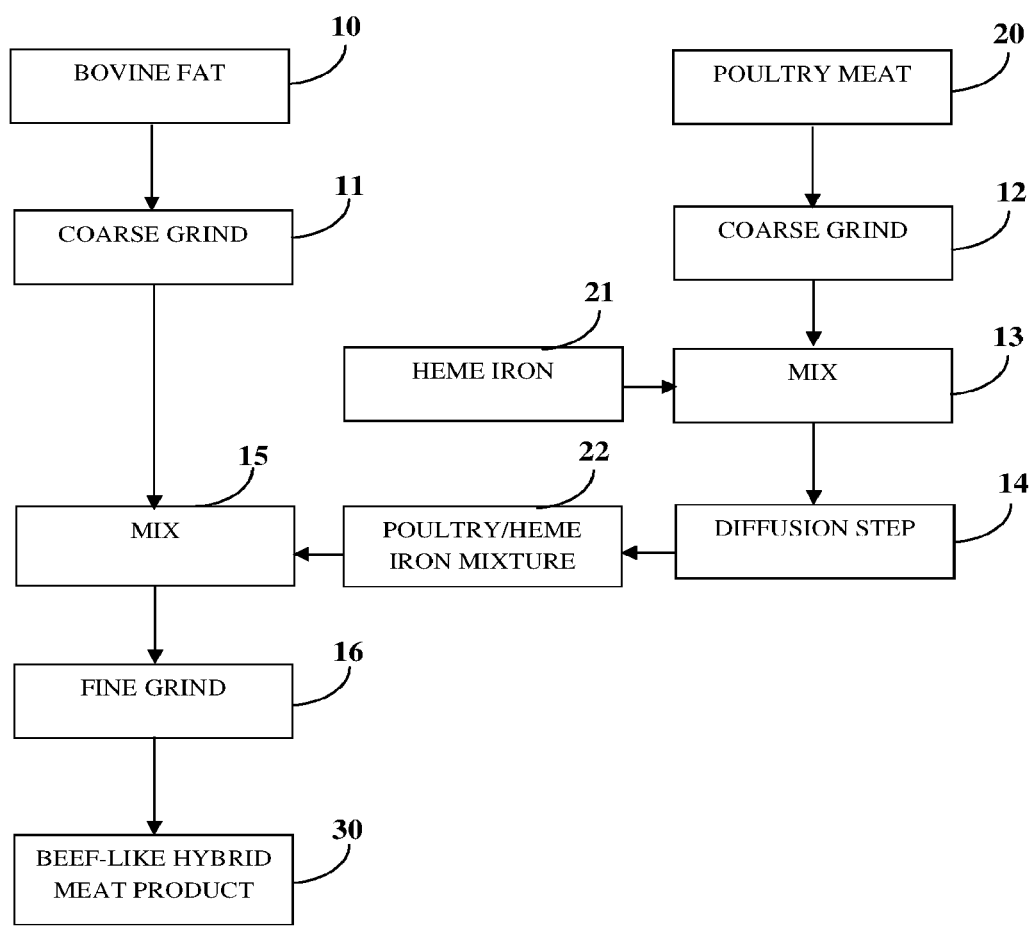

HYBRID MEAT PRODUCT AND METHOD OF PRODUCTION

FIELD OF THE INVENTION

The present invention relates to a hybrid meat product and methods for producing the hybrid meat product. More particularly, embodiments of the hybrid meat product include components derived from animal or plant tissue and/or synthetic sources. The hybrid meat product disclosed herein provides taste, health, and environmental benefits relative to a pure meat product.

BACKGROUND

Beef, which is meat harvested from members of the bovine family such as cows, is an expensive meat to produce and one that exacts a high price in the market. 24 billion pounds of beef were consumed in the United States in 2015 corresponding to 27 trillion calories of human nutrition. Beef cattle production accounts for almost 90 percent of the land used for raising livestock in the US, acreage that includes pasture as well as cropland for growing feed. Table 1 below summarizes the environmental cost of producing 1,000 calories of meat for human consumption from beef, poultry, and pork.

TABLE 1

The environmental cost of producing 1,000 calories of meat for human consumption from beef, poultry, or pork.

| Resource | Beef | Poultry | Pork |
| --- | --- | --- | --- |
| Square feet of land required | 1,557 | 44 | 57 |
| Calories of animal feed | 36,200 | 8,800 | 11,200 |
| Gallons of water | 434 | 38 | 49 |
| Kilos of carbon dioxide produced | 10 | 2 | 2 |

(Ref: National Geographic Carnivore's Dilemma).

Even without factoring in the cost of these environmental externalities, the retail price of ground chuck beef in 2015 in the US was approximately $4 per pound, whereas ground chicken costs approximately $1 per pound. Therefore, many families struggle to afford beef due to budgetary considerations.

Many attempts of creating substitute meat products from plants sources have yet to create a product that has offset in any meaningful way the consumption of beef in the market. Plant based meat substitutes are consumed mainly among vegetarian and vegan consumers who represent only about 3% of the US population (ref: 2016 Harris Poll). Most carnivores who have eaten state-of-the-art meat substitutes still report not being sufficiently satisfied with the flavor and texture of meat substitutes to stop eating meat altogether.

Therefore, the remaining 97% of US consumers eat meat and will likely continue to consume meat. In the US, meat is consumed in the amounts shown in Table 2 below.

TABLE 2

Per Capita Consumption of Poultry and Livestock in the US in 2016

| Meat | Pounds per capita |
| --- | --- |
| Beef | 55 |
| Poultry | 108 |
| Pork | 50 |

(ref: National Chicken Council)

Example 17 of US patent application publication number 2015/0305390 by Vrljic et al. describes adding recombinant myoglobin or leghemoglobin to ground chicken meat to give chicken meat the aroma and flavor of beef. When the 0.12% wt/wt native myoglobin level in chicken was augmented by 0.5% wt/wt externally supplied myoglobin, for a total of 0.62% wt/wt myoglobin which is higher than the natural level of myoglobin found in beef as per table 2 above, the aroma and flavor of heme-augmented chicken meat did not approach those of beef. Even when ground chicken meat was augmented to a final myoglobin concentration of 1.12% wt/wt, which is nearly twice the normal concentration of myoglobin naturally present in beef, the heme-augmented chicken still failed to fully convince the tasting panel that the flavor of the meat product created was equivalent to that of beef, having achieved at most a score of 4 out of 5 on a scale of taste with 1 being chicken and 5 being beef.

In the above experiment, the source of fat in the heme-augmented chicken was 100% chicken fat, while the source of fat in the beef control meat was 100% beef fat. Without allowing for the target-species fat to dominate the fat content of the hybrid meat product, adding heme iron simply provided a bland, generic meaty taste that did not create a full and convincing replacement of the target-species meat. The natural level of heme iron in red meat is only 10 micrograms/gram. It is important to keep the overall level of heme iron in meat products to be at or below 15 micrograms/gram to avoid iron overdosing, iron poisoning and various other detrimental health effects of consuming too much heme iron as described in Food Nutr Sci. 2012 Jul. 1; 3(7): 905-913. In the example above from US patent application publication number 2015/0305390, the heme iron concentration in the heme iron augmented chicken reached 19 micrograms/gram which is nearly twice the natural levels in beef and too high for safe consumption by humans over time. Even at these unsafe and unnaturally-elevated levels of heme iron, the tasting panel was not convinced that the flavor of the meat product created was equivalent to that of beef, having achieved only 4 out of 5 on a scale of taste where 1 is chicken and 5 is beef. In summary, US patent application publication number 2015/0305390 demonstrates that trying to convert chicken meat to have the equivalent taste and aroma of beef solely by augmenting the heme iron concentration of chicken meat is neither possible nor safe.

Red meat such as beef contains high biological value protein and important micronutrients and iron that are needed for good health throughout life. Red meat also contains a range of fats, including essential omega-3 polyunsaturated fats. Therefore, for the 97% of the US population that eats meat, there is a widely recognized need for a hybrid meat product that provides a consumer with the taste, smell, texture and nutritional benefits of eating beef, while using less expensive and more environmentally friendly sources of ingredients, such as those found in poultry or pork together with certain elements of beef or beef byproducts, as the basis of the hybrid meat product.

SUMMARY OF THE INVENTION

The present invention provides combinations of animal products and methods of combining animal products to create a beef-like hybrid meat product at reduced cost and reduced environmental impact when compared to beef.

Unless otherwise defined, all technical and scientific terms used herein have the same meaning as commonly understood by one of ordinary skill in the art to which this invention belongs. Although methods and materials similar or equivalent to those disclosed herein can be used in the practice of the present invention, suitable methods and materials are disclosed below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying FIGURE. With specific reference now to the FIGURE in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the FIGURE making apparent to those skilled in the art how the several forms of the invention may be embodied in practice. In the drawings:

FIG. 1 illustrates a flow chart of a method for producing a beef-like hybrid meat product starting from a poultry meat source.

DETAILED DESCRIPTION OF THE INVENTION

Before explaining at least one embodiment of the invention in detail, it is to be understood that the invention is not limited in its application to the details of construction and the arrangement of the components set forth in the following description. The invention is capable of other embodiments or of being practiced or carried out in various ways. Also, it is to be understood that the phraseology and terminology employed herein is for the purpose of description and should not be regarded as limiting.

The main components of meat are protein in the form of muscle tissue and fat. These two components determine meat quality to varying degrees depending on species, muscle type, and post-slaughter meat-processing techniques.

Red meat, such as beef, also contains high levels of myoglobin which contains within it heme iron molecules, which in turn contain iron. 90% of the blood-red pigmentation of red meat is due to presence of myoglobin. White meat, such as chicken, contains low levels of myoglobin. Table 3 shows the typical amounts of myoglobin and heme iron in beef and chicken breast. The concentration of myoglobin in beef is 0.6% (wt/wt) and in chicken is 0.12% (wt/wt).

TABLE 3

Typical amounts of myoglobin and heme iron in beef (red meat) and chicken (white meat).

| Meat type | Myoglobin (milligrams/gram) | Heme iron (micrograms/gram) |
|---|---|---|
| Beef (red meat) | 6.0 | 10 |
| Chicken (white meat) | 1.2 | 2 |
| Ratio beef/chicken | 5:1 | 5:1 |

(Refs: Food Nutr Sci. 2012 Jul. 1; 3(7): 905-913, and J Food Sci. 2009 January-February; 74(1): C41-8.)

Myoglobin is an important source of easily absorbed heme iron, which is an essential nutrient, thus reinforcing the need for red meat in the human diet.

Color is the first impression consumers have of any meat product and often is their basis for product selection or rejection. Bright red-colored raw meat appears fresher and more appealing to a consumer. The red color in raw red meat is unstable and largely dependent on the oxidation state of the heme iron. Oxyhemoglobin, the dioxygen ferrous form, is bright red in color. However, when the heme iron is oxidized to $Fe^{3+}$ the resulting hemoprotein, known as methemoglobin (metHb), has a characteristic brown color that is unappealing to consumers when the meat is raw.

Hemoglobin consists of four myoglobins linked together as a tetramer via salt bridges, hydrogen bonds and hydrophobic effects. Hemoglobin based meat color enhancers have been used to restore the original color of cooked or processed red meats such as beef or pork that have developed a pale or brownish appearance due to cooking, processing or oxidation. The use of hemoglobin colorant enhancement is mainly cosmetic in order to encourage the consumer to accept the processed or cooked red meat as more natural looking. The hemoglobin or heme iron based red color enhancement in poultry products is not generally performed as consumers expect raw poultry to be light tan in color.

Natural meat flavor is derived from water soluble components and lipid components that undergo the Maillard reaction upon heating. Aroma released by the heated lipid components appears to be the most important contributor to the identification of the species of animal from which meat is derived. Species specific beef flavor is mainly associated with more than 650 fat-soluble volatiles that are released when beef is heated. Phospholipids from lean muscle may contribute the majority of important species specific flavor volatiles in beef, implying that species flavor may not be based on the neutral fat or triglyceride portion of meat alone. The other elements of meat, such as the protein and heme iron content, generate a generic meaty flavor and aroma common to all cooked meats.

Aroma is sensed when volatile compounds bind to receptors in the olfactory bulb behind the nasal cavity and stimulate a response. Both flavor and aroma release depend on the matrix in which they are embedded, therefore, the texture of the protein component of meat has a tertiary effect on both because it modulates when they are available to be perceived. As opposed to fat, the protein content of meat is a more interchangeable component between poultry, pork, and beef as far as nutrition, flavor and texture. In an embodiment, the main source of protein for the hybrid meat product can be obtained from a fairly inexpensive and low environmental impact family, for example poultry, while the main source of fat for the hybrid meat product can be obtained from a second more expensive and higher environmental impact family, for example beef. Beef fat and beef blood are considered low value byproducts in the cattle harvesting process and therefore are available at low cost and without creating further environmental damage.

As is mentioned hereinabove, attempts have been made to impart beef flavor and aroma to white meat such as poultry. However, taste tests indicated that such attempts have failed to fully recapitulate the taste and aroma of beef.

Disclosed herein is a beef-like hybrid meat product that successfully combines three distinct elements to fully and satisfactorily recapitulate the taste and aroma of beef.

One embodiment of the present invention relates to a beef-like hybrid meat product comprising a combination of protein from a poultry source, fat from a bovine source, and externally supplied heme iron from a blood source.

Another embodiment of the present invention relates to a beef-like hybrid meat product wherein a ratio of fat from a poultry source to fat from a bovine source is less than 1:5.

Another embodiment of the present invention relates to a beef-like hybrid meat product, wherein a ratio of protein from a bovine source to protein from a poultry source is less than 1:2.

Another embodiment of the present invention relates to a beef-like hybrid meat product wherein a concentration of heme iron is in a range of about 5 micrograms per gram to about 15 micrograms per gram of beef-like hybrid meat product.

Another embodiment of the present invention relates to a method for producing a beef-like hybrid meat product that combines protein from a poultry source, fat from a bovine source, and externally supplied heme iron.

Another embodiment of the present invention relates to a method for producing a beef-like hybrid meat product wherein a ratio of fat from a poultry source to fat from a bovine source is less than 1:5.

Another embodiment of the present invention relates to a method for producing a beef-like hybrid meat product wherein a ratio of protein from a bovine source to protein from a poultry source is less than 1:2.

Another embodiment of the present invention relates to a method for producing a beef-like hybrid meat product wherein a concentration of heme iron is in a range of about 5 micrograms per gram to about 15 micrograms per gram of beef-like hybrid meat product.

Another embodiment of the present invention relates to a method for producing a beef-like meat product wherein the heme iron is mixed or ground with the protein from a poultry source prior to mixing or grinding of the heme iron with fat from a bovine source. Pre-mixing of the heme iron with the relatively lighter poultry meat enables preferential diffusion of the heme iron into the poultry meat. In this manner, the level of heme-iron, and hence the uncooked red color and cooked brown color of the heme-iron/poultry mixture matches the natural heme-iron content of beef. Mixing the heme-iron with the poultry and beef proteins together allows the heme-iron to diffuse into both the poultry and bovine proteins and leads to a non-uniform distribution or uncooked red color and cooked brown color of the hybrid meat product.

The terms "beef-like hybrid meat product" and "hybrid meat product" have identical meaning in this application when the intended taste and aroma of the hybrid meat product is beef. The following embodiments disclose the invention in more detail.

In one embodiment, the fat or lipid content from the first animal family is less than 5% of the total weight of the hybrid meat product.

In another embodiment, the fat or lipid content from the second animal family is in the range of 10% to 30% of the total weight of the hybrid meat product.

In another embodiment, the hybrid meat product contains a ratio of less than 1:2 or less than 1:5 of fat or lipids originating from the first animal family compared to the fat (or lipids) originating from the second animal family.

At the same time, to maintain low cost and environmental impact, the protein from the second animal family is limited to 50% or less of the total weight of the hybrid meat product. In an embodiment, the protein from the second animal family is limited to 40% or less of the total weight of the hybrid meat product. In an embodiment, the protein from the second animal family is limited to 30% or less of the total weight of the hybrid meat product.

In another embodiment, the hybrid meat product contains a ratio of less than 1:1 or less than 1:2 of protein originating from the second animal family compared to the protein originating from the first animal family.

In another embodiment, the first animal family is poultry, for example chickens or turkeys, or suidae, for example pigs, and the second animal family is bovine, for example cows.

In another embodiment, unground white meat muscle tissue of a low environmental impact first animal family, for example chicken, can have an externally supplied heme iron and/or beef fat embedded within the muscle tissue to create a hybrid meat product with the look and taste of beef.

In another embodiment, the hybrid meat product contains beef trimmings which contain 50% lean protein and 50% fat, known as "beef 50" or "beef 50/50 trimmings", which are low value byproducts left over when processing a cow for muscle cuts.

In another embodiment, the hybrid meat product contains beef trimmings which contain 65% lean protein and 35% fat, known as "beef 65" or "beef 65 trimmings", which are low value byproducts left over when processing a cow for muscle cuts.

In another embodiment, the hybrid meat product contains beef trimmings which contain 75% lean protein and 25% fat, known as "beef 75" or "beef 75 trimmings", which are low value byproducts left over when processing a cow for muscle cuts.

In another embodiment, the hybrid meat product contains beef trimmings which contain 80% lean protein and 20% fat, known as "beef 80" or "beef 80 trimmings", which are low value byproducts left over when processing a cow for muscle cuts.

In another embodiment, the added heme iron is in the form of whole blood, isolated red blood cells, or further isolated hemoglobin from an animal, for example a chicken, a pig or a cow.

In another embodiment, whole red blood cells, that is erythrocytes, containing hemoglobin are isolated from blood of an animal using standard techniques such as centrifugation and added whole or ruptured, in their natural concentration, diluted or concentrated form, to the hybrid meat product.

In another embodiment, heme iron and fat or lipids are turned into a suspension, colloid, or emulsion, and added combined to the hybrid meat product in one step.

In an embodiment, the hybrid meat product has a concentration of heme iron in the range of about 3 micrograms per gram of the hybrid meat product to about 20 micrograms per gram of hybrid meat product. In another embodiment, the hybrid meat product has a concentration of heme iron in the range of about 5 micrograms per gram of hybrid meat product to provide a convincing taste and aroma of red meat as determined experimentally in Table 6, to about 15 micrograms per gram of hybrid meat product to minimize the risk of iron overdose or iron poisoning.

In another embodiment, the fat from one of the animal families added to the hybrid meat product is derived from lean muscle, suet, or from other fat surrounding an internal organ of the animal.

In another embodiment, a source of the poultry protein used in the hybrid meat product is mechanically separated from the carcass of the animal.

In another embodiment, a source of the poultry protein used in the hybrid meat product is de-sinewed drumsticks.

In an embodiment, the hybrid meat product has a total concentration of iron, that is the sum of free iron and heme iron, in the range of about 1 milligram per 100 grams of the hybrid meat product to about 4 milligrams per 100 grams of the hybrid meat product. In another embodiment, the hybrid meat product has a total concentration of iron in the range of about 1.5 milligrams per 100 grams of the hybrid meat product to provide a convincing "metallic taste" of red meat as determined experimentally in Table 6 to about 3 milligrams per 100 grams of the hybrid meat product to avoid iron overdose or iron poisoning.

In another embodiment, the hybrid meat product is produced by emulsifying or blending the protein, fat, and iron components together and then pressing or extruding the mixture into a sausage or a hot dog, and in an embodiment optionally enveloping the sausage or the hot dog in a casing.

In another embodiment, the hybrid meat product is produced from unground muscle tissue of a first animal family either as whole muscle cuts or as sections 2 millimeters (mm) to 30 mm thick. These sections can be cooked and served as is, or these sections can be adhered to one another to resemble a steak.

With reference to FIG. 1, a ground beef-like hybrid meat product 30 can be created in the following manner. Bovine fat 10 is beef fat trimmings that undergo a coarse grind 11 using holes of 4 mm to 8 mm in diameter. Poultry meat 20 is a relatively lean white meat that undergoes a coarse grind 12 using holes of 4 mm to 8 mm in diameter. Heme iron 21, in any of the forms disclosed herein, is mixed together with poultry meat 20 in mix 13 and then subjected to a diffusion step 14 to create a poultry meat/heme iron mixture 22. Coarse grind 12 of poultry meat 20 reduces the maximum diffusion distance for heme iron 21 to 4 mm for easy and uniform distribution of heme iron 21 into poultry meat 20. Bovine fat 10 and poultry meat 22 are mixed in a desired ratio in mix 15 and then ground together in a fine grind 16 using holes of 2 mm to 4 mm in diameter. This enables a uniform distribution of all the components of the beef-like hybrid meat product 30 with a maximum "lumpiness" of features, such as fat chunks, of 2 mm to 4 mm in diameter.

Table 4 below shows a nutritional analysis of a hybrid meat product produced using the methods disclosed herein. Ground whole chicken meat is combined with beef fat at relative weights of 87%: 13% together with heme iron to create a hybrid meat product. This hybrid meat product closely approximates that the look, taste, flavor and nutritional content of ground beef with 20% total fat content, of which 65% of the fat, and hence the flavor, is from beef. In this example, the ratio of fat originating from the first animal family, for example chicken, compared to the fat originating from the second animal family, for example beef, is around 1:2 which is slightly biased in the direction of beef fat.

TABLE 4

Nutritional analysis of 100 grams of ground chicken, beef fat, a hybrid meat product combining the two in relative weights of 87%:13%, compared to 80% lean ground beef typically used for making hamburgers.

|  |  | Ground chicken | Beef fat | Hybrid meat product | 80% lean ground beef |
|---|---|---|---|---|---|
| Water | grams | 73 | 0 | 64 | 62 |
| Energy | kcal | 143 | 902 | 242 | 254 |
| Energy | kJ | 598 | 3774 | 1011 | 1062 |

TABLE 4-continued

Nutritional analysis of 100 grams of ground chicken, beef fat, a hybrid meat product combining the two in relative weights of 87%:13%, compared to 80% lean ground beef typically used for making hamburgers.

|  |  | Ground chicken | Beef fat | Hybrid meat product | 80% lean ground beef |
|---|---|---|---|---|---|
| Protein | grams | 17 | 0 | 15 | 17 |
| Total lipid (fat) | grams | 8 | 100 | 20 | 20 |
| Fatty acids, total saturated | grams | 2 | 50 | 8 | 8 |
| Iron | mg | 0.8 | 0 | 1.9* | 1.9 |

(Source: USDA).
*Requires a separate addition of heme-iron to the hybrid meat product.

Instead of whole ground chicken with 8% total fat, an even more beef-like hybrid meat product can be made by combining lean chicken meat, for example boneless skinless chicken thigh with 4% fat content or boneless skinless chicken breast with 2% fat content with proportionally more beef fat.

In an embodiment utilizing boneless skinless chicken thigh, the hybrid meat product is composed of 63% boneless skinless chicken thigh meat and 37% beef with a lean content of 50% ("beef 50"), leading to a hybrid meat product that has a total of 20% fat, of which 86% of the fat, and hence the flavor, is from beef. In this example, the ratio of fat originating from the first animal family, for example chicken, compared to the fat originating from the second animal family, for example beef, is less than 1:5, which is highly biased in the direction of beef fat, thus giving more beef like taste to the hybrid meat product relative to the product disclosed in Table 4 above. The ratio of protein from the beef relative to the protein coming from the chicken is approximately 1:3.

In an embodiment utilizing boneless skinless chicken breast, the hybrid meat product is composed of 82% chicken breast meat and 18% beef fat, leading to a hybrid meat product that has a total of 20% fat, of which 90% of the fat, and hence the flavor, is from beef. In this example, the ratio of fat originating from the first animal family, for example chicken, compared to the fat originating from the second animal family, for example beef, is 1:9 which is even more highly biased in the direction of beef fat, thus giving an even more beef like taste to the hybrid meat product relative to the product disclosed in Table 4 above. In this example, there is no beef protein in the hybrid meat product, that is, all of the protein is from the chicken.

In a tasting panel, 5 ground meat patties were offered to panelists as per Table 5 below. Patties A, B, C and D were hybrid meat products prepared as disclosed above with bovine hemoglobin added to all 4 patties to normalize the total heme iron content to 10 micrograms per grams of the hybrid meat product, equivalent to the natural myoglobin content of beef of 0.6% wt/wt as per Table 3, but with varying ratios of chicken fat to beef fat from none to 1:9. Patty E was a control patty made from pure 80% lean ground beef with no chicken fat or external hemoglobin added to the pure 80% ground beef. All patties were cooked at the same time on a hot skillet to 165 degree F. Panelists rated the aroma and flavor of each patty on the following scale:
1=all chicken
2=mainly chicken, faint beef
3=equal parts chicken and beef
4=mainly beef, faint chicken
5=all beef

TABLE 5

The results of a tasting panel exploring the relative amounts of chicken fat to beef fat to produce a beef equivalent hybrid meat product.

| Patty ingredient | Patty A | Patty B | Patty C | Patty D | Patty E |
|---|---|---|---|---|---|
| Heme iron (micrograms/gram) | 10 | 10 | 10 | 10 | 10 |
| Chicken fat:Beef fat | All chicken | 1:2 | 1:6 | 1:9 | All beef |
| Chicken fat content | 8% | 7% | 3% | 2% | 0% |
| Beef fat content | 0% | 13% | 17% | 18% | 20% |
| Aroma | 2.5 | 4.0 | 5.0 | 5.0 | 5.0 |
| Flavor | 2.0 | 3.5 | 5.0 | 5.0 | 5.0 |

In a subsequent tasting panel, 5 ground meat patties of varying heme iron content were offered to panelists as per Table 6 below. Patties F, G, H and I were the hybrid meat products prepared as per the description of patty C above with chicken fat to beef fat ratio equal to 1:6, but with varying amounts of heme iron ranging from 0 micrograms per grams of the hybrid meat product to 20 micrograms per grams of the hybrid meat product. Patty J was a control patty made from pure 80% lean ground beef with no chicken fat or external hemoglobin added to the pure 80% ground beef. All patties were cooked at the same time on a hot skillet to 165 degree F. Panelists rated the aroma and flavor of each patty on the following scale:
1=all chicken
2=mainly chicken, faint beef
3=equal parts chicken and beef
4=mainly beef, faint chicken
5=all beef

TABLE 6

The results of a tasting panel exploring the relative amounts of heme iron and total iron to produce a beef equivalent hybrid meat product.

| Patty ingredient | Patty F | Patty G | Patty H | Patty I | Patty J |
|---|---|---|---|---|---|
| Herne iron (micrograms/gram) | 2 | 5 | 10 | 20 | 10 |
| Total iron (milligrams per 100 grams) | 1 | 1.5 | 2 | 3 | 2 |
| Chicken fat:Beef fat | 1:6 | 1:6 | 1:6 | 1:6 | All beef |
| Chicken fat content | 3% | 3% | 3% | 3% | 0% |
| Beef fat content | 17% | 17% | 17% | 17% | 20% |
| Aroma | 3.5 | 5.0 | 5.0 | 5.0 | 5.0 |
| Flavor | 3.0 | 5.0 | 5.0 | 5.0 | 5.0 |

While the chicken to beef fat ratio of 1:6 gave all hybrid meat product patties a flavor and aroma that took the hybrid meat product patties in the direction of beef compared to pure ground chicken, that was not enough to convince the panelists that the hybrid meat product of patty F was the sensory equivalent to beef. In addition to requiring a minimum chicken fat to beef fat ratio of less than 1:5, the threshold for completely recreating the aroma and taste of the ground beef product was a minimal heme iron concentration of 5 micrograms/gram of hybrid meat product, as indicated by the panelists' assessment of patty C and equivalently patty H. Therefore, in order to convert the aroma and taste of chicken meat to beef, the hybrid meat has both a chicken fat to beef fat ratio of less than 1:5 and a minimum concentration of heme iron of 5 micrograms/gram of hybrid meat product.

In an embodiment, the hybrid meat product is made to resemble pork. In this embodiment, the first animal family is poultry, and the second animal family is suidae, for example a pig. In this embodiment, the protein content is supplied by the poultry and the majority of fat content is supplied by the pig. The heme iron can be obtained from either, both, or a different animal family altogether.

In another embodiment, the heme iron source can be an internal organ of an animal. Examples comprise giblets, bone marrow, spleen or liver which contain significantly more heme iron than muscle tissue. For example, 9% chicken liver, 57% boneless and skinless chicken thigh meat and 34% beef with a 50% lean content creates a hybrid meat product with substantially similar look, taste, and nutritional characteristics of the beef-like hybrid meat product 30 as per patty C and equivalently patty H above or Example 2 below.

In another embodiment, the heme iron is obtained from a plant source such as leghemoglobin.

In another embodiment, the heme can be created with tools of biotechnology using the underlying genetic sequence of the protein introduced into a bacteria, yeast or plant protein expression system.

In another embodiment, the hybrid meat product contains free iron, for example the Fe2+ ferrous ion, and a red colorant, for example carmine (E120), beet red (E162), or a fermented rice extract, to provide the hybrid meat product with the color and iron content similar to red meat.

In another embodiment, the tenderness of the cut of the source meat, for example chicken breast, that will be used to create the hybrid meat product can be at or below the tenderness of the cut of the target meat, for example beef tenderloin, as measured by the Warner-Bratzler shear force after the processing that creates the hybrid meat product.

For example, even though chicken breast and beef tenderloin both have a native Warner-Bratzler shear force of 3 kg, adding beef fat into the chicken breast can increase tenderness due to bulk density and/or lubrication effects, thereby lowering the Warner-Bratzler shear force of a whole muscle hybrid meat product made from chicken breast to below 3 kg. One method of reducing the Warner-Bratzler shear force is therefore to introduce additional fats or lipids to the cut of meat though any of the techniques disclosed herein.

The cooking yield of a meat product is defined as 100%* (cooked weight/raw weight). In an embodiment, the hybrid meat product has a cooking yield above 80%. In another embodiment, the hybrid meat product has a cooking yield that is at least 5% above the weighted average of the cooking yields for the individual meat components of the hybrid meat product. This increased cooking yield can apply to both ground and whole muscle hybrid meat products. Any or all of the components from the added heme iron, for example whole blood, serum, plasma, red blood cells and/or hemoglobin, may be responsible for the increased water retention and hence increased cooking yield of at least 5% of the hybrid meat product relative to its component meats.

In an embodiment disclosed in the Examples section below, a whole muscle portion of lean white meat can be modified into a hybrid meat product that resembles the tenderness, look, texture, smell, taste, and nutritional qualities of a whole-muscle portion of red meat. In addition to matching the tenderness of white meat to that of the red meat, it is necessary for the hybrid meat product to also match the fat, flavor, color, and nutritional content of the red meat muscle cut. Since hemoglobin is an outstanding emulsifier of fat, the matching can be accomplished with a uniform diffusion, infusion, or injection into the white meat of a mixture of fat from the red meat emulsified with heme iron. The fat/heme emulsion also serves to further tenderize the white meat due to the bulk density and/or lubrication effects disclosed above to an extent where the Warner-Bratzler shear force can be below 3 kg, thereby making the hybrid meat product even more tender than the most tender red meat cut.

It is known than consumers want to buy beef muscle cuts that look very lean, even to the point of being completely devoid of visible marbling. However, when fed steaks, consumers routinely prefer the ones that are moderately or highly marbled. In beef relative to chicken, an increased proportion of type I muscle fibers is associated with improved meat juiciness and flavor, possibly due to the high phospholipid content of type I fibers in the form of intramuscular fat. Phospholipids are a major determinant of the flavor and juiciness of cooked meat Therefore, in an embodiment, the hybrid meat product has augmented intramuscular fat content that is fairly uniformly distributed throughout the whole muscle cut and is not visible to the consumer. For example, a chicken breast with 2% intramuscular fat can be augmented to 3% or higher total intramuscular fat typical of a beef steak with the added beef fat deposited sufficiently uniformly in the chicken breast as to not be visible to the consumer. In another embodiment, the lipid content of chicken meat is augmented to a minimal fat level of about 12% where the chicken fat contributes 2% and the beef fat contributes 10% thus providing a chicken fat to beef fat ratio of 1:5.

In an embodiment that creates a leaner hybrid meat product, the fat/heme emulsion is replaced with a heme solution, for example, in the form of whole blood, erythrocytes, hemoglobin, myoglobin, and/or heme iron. In an example, a chicken breast infused or injected with a heme iron solution will have approximately 2% fat compared to the leanest cuts of beef that have 6% fat.

The heme solution needs to diffuse into the existing water of the white meat, and/or partially or fully replace the existing water content of the white meat to uniformly distribute the desired color and flavor into the hybrid meat product.

Heme iron is not easily transportable across muscle bundles found in meat cuts. Muscle bundles are surrounded by connective tissue which is highly impermeable to heme iron. In vivo, heme iron is contained in muscle cells in the form of myoglobin or in red blood cells in the form of hemoglobin, and does not cross cell membranes or connective tissues. Endomysium is the connective tissue covering of muscle fibers. Perimysium is the connective tissue covering of muscle bundles. Epimysium is connective tissue covering of entire muscle. None of these connective tissues readily allow diffusion of heme iron.

Commercial equipment exists for the injection of brine into meat. Brine is water containing dissolved small molecules such as salt and curing substances, for example nitrite, as well as additives such as phosphates to improve water retention of the meat during cooking. The injection is done by introducing pointed needles into the muscle tissue, typically at a linear spacing of approximately 1 inch to 2 inches between needles, for example, Fomaco M2, Fomaco Koge Denmark. As the injected salt or nitrite solutions are typically clear in color and easily diffuse throughout muscle tissue, there is no need to inject at a higher density to uniformly distribute the injected substances into the meat.

On the other hand, unlike low molecular weight salts, heme iron is 17,000 to 64,000 daltons in size and is not normally transferred across cell membranes. In vivo, only the oxygen and carbon dioxide are shuttled between cell membranes and transported by the heme iron which stays in the muscle cells or red blood cells at all times. The diffusivity of myoglobin in a skeletal muscle cell is, for example, about $1.2 \times 10^{-11}$ m$^2$/seconds and that of hemoglobin is, for example, about $3 \times 10^{-12}$ m$^2$/seconds. The intracellular diffusion rate of hemoglobin is approximately 100 times higher than the intercellular diffusion rate due to capillary spaces and gaps between cells. Therefore, hemoglobin is estimated to diffuse into meat muscle tissue at a rate of $3 \times 10^{-12}$ m$^2$/seconds. Prior art meat injection techniques utilizing 1 inch spacing between the needles create diffusion circles of 0.7 inches radius corresponding to diffusion areas of $1 \times 10^{-3}$ m$^2$. At this injection density, it would take hemoglobin $0.3 \times 10^7$ seconds or approximately 35 days to diffuse uniformly through the muscle tissue, which is longer than the shelf life of the meat product. Before sufficient diffusion time has elapsed, the hybrid meat product injected by commercial injection machines will appear as white meat with non-uniform splotches of red meat, an unacceptable outcome. An injection density of one injection every 2 mm spacing creates diffusion circles of $4 \times 10^{-6}$ m$^2$. It only takes hemoglobin 3.5 hours to uniformly diffuse within the muscle tissue, which is an acceptable diffusion time in the meat processing industry. Therefore, heme iron, for example hemoglobin, must be injected at a density at least 10 times, or at least 50 times denser than current brine injection techniques given the low diffusion rate of hemoglobin.

In an embodiment, the muscle tissue is injected with heme or fat/heme solution using needles of 18 gage or smaller, at a deposition density of 4 mm$^2$ or less between injection sites to create a hybrid meat product. The diffusion length of the heme or fat/heme solution is therefore limited to 2 mm to fully and uniformly color the muscle tissue with heme. Injection of brine into meat is a process that does not need injection at such a high density as the physical distribution of a clear solution is not critical. With the injection of a solution containing the colored heme iron, the maximal diffusion distance of about 2 mm of heme iron in muscle tissue over a time period of several hours requires this much higher injection density of about 4 mm$^2$ or less between injection sites.

In an embodiment, the muscle tissue is pierced with a solid pin or a spike at a density of 4 mm$^2$ or less between penetration sites. For example, an array of 1 mm diameter pins spaced 2 mm apart produces such a penetration density. Heme or fat/heme solution is deposited into the muscle tissue through the resulting pores by soaking, vacuum, pressure differential or other techniques disclosed below. The diffusion length of the heme or fat/heme solution is therefore limited to 2 mm to fully and uniformly color the hybrid meat product with heme. In another embodiment, the muscle tissue is punctured by the needles or pins while the muscle tissue is submerged in the heme or heme/fat solution.

In an embodiment, the pins have longitudinal slits or grooves to allow the surrounding heme or heme/fat solution to soak into the muscle tissue along the side of the pins while the submerged needle is inside the muscle tissue. This approach makes it unnecessary to push a solution though a small diameter hollow needle that can easily clog. In another embodiment, at least a portion of the solid pins are cross shaped in cross section to allow the submerged solution to enter the muscle tissue through the channels along the sides of the pins when the pins are penetrating the tissue. In another embodiment, the pins are flat knives that tilt or rotate once the pins have penetrated the muscle tissue to prop open the muscle tissue sufficiently to create a space so that the solution in which the muscle tissue is submerged can enter the space. In this embodiment, the knife is oriented along the muscle fibers to minimize damage to the muscle tissue. The tilting or twisting of the knife acts to separate muscle fibers or bundles as opposed to severing the muscle fibers or bundles. This approach creates entry marks of a linear slit which reseal easily leaving little or no evidence of penetration. In the embodiments disclosed above, the solution surrounding the muscle tissue enters alongside the penetrating needles or pins. The solution does not need to be conveyed and delivered through hollow penetrating needles.

In an embodiment, the heme or fat/heme solution is introduced into the muscle tissue using water jet technology through a nozzle 0.1 mm to 1 mm in diameter with a minimum pressure of 40 millibar (mbar) at a minimum deposition density of one injection every 9 mm$^2$, or in an embodiment one injection every 4 mm$^2$. In this embodiment, the heme or fat/heme solution is pressurized and penetrates the muscle tissue to a desired depth or even goes straight through the muscle tissue. Pressure can be regulated so that an initial high pressure burst creates an entry hole in the muscle tissue to the desired depth and then a lower pressure burst fills the muscle tissue with a bolus of heme or fat/heme solution through the entry hole. Such systems can be configured in a linear or two dimensional array of jets and then moved relative to the surface of the muscle tissue without physical contact to the muscle tissue itself. In this embodiment, the iron, fat, or fat/iron solution is introduced into the muscle as a linear-scanned or raster-scanned tissue-penetrating jet with precise depth and volumetric controls. The volume of injected solution can be varied based on determining the thickness of the meat tissue, which can be measured with sensors in real time to accommodate for a thickness variation between muscle cut pieces, or even a thickness variation in a single piece of meat. The opening created on the surface of the meat by the water jet of less than 1 mm diameter can be less conspicuous that the entry hole of a needle or pin penetration, leading to a more uniform and esthetic coloration of the hybrid meat product. Furthermore, water jet technology is easier to clean, maintain and keep clog free compared to fine gage needles used in a high density injection array.

In an example, beef tallow, with or without added heme or iron, is heated to about 35 degrees Celsius to about 40 degrees Celsius and melted into a liquid. The liquid tallow is introduced into a heated reservoir and pressurized to 40 mbar, and connected to a nozzle of 0.5 mm diameter. The liquid tallow emerges out of the nozzle at a velocity sufficient to penetrate the chicken breast. The "tallow jet" can be pulsed at a set duty cycle and raster scanned a few millimeters over the chicken breast at a speed that allows for the appropriate amount of fat to be added to the hybrid meat product. A similar technique can be used for beef suet at a slightly higher melting temperature of 45 to 50 degrees Celsius.

Methods for introducing the heme solution or fat/heme emulsion solution into the white meat muscle tissue comprise the following, which can be performed either singly, or in sequential or simultaneous combinations:

1. Direct injection of the heme or fat/heme into a fresh or frozen whole muscle at a density of 4 mm$^2$ or less between injection sites to limit the radius of diffusion of the heme or fat/heme solution to 2 mm or less. The injection can be via needles, water jet or cryojet technology.
2. Mechanically piercing the muscle at a density of 4 mm$^2$ or less between piercing sites to limit the radius of diffusion of the heme or fat/heme solution to 2 mm prior to or during soaking the muscle in the heme or fat/heme solution.
3. Soaking the whole muscle in a heme or fat/heme solution at an elevated pressure, a normal pressure, or a negative pressure or vacuum, or cycling between such pressures.
4. Soaking the whole muscle in a heme or fat/heme solution at around 37 degrees C., room temperature, or around 4 degrees C., or cycling between such temperatures.
5. Physical pressure differential between the muscle and the heme or fat/heme solution applied directly to the surface of the whole muscle.
6. Osmotic pressure differences between the muscle tissue and the heme or fat/heme solution.
7. Using salts or macromolecules to cause hypertonic or hypotonic lysis of the cells using, for example, polyethylene glycol (PEG), sucrose, etc., before soaking the muscle tissue in the heme or fat/heme solution.
8. Ultrasound energy applied to the muscle to enhance diffusion of the heme or fat/heme solution.
9. Full or partial freeze drying the muscle and rehydration in a heme or fat/heme solution.
10. Fully or partially dehydrating the muscle in a solvent, for example, alcohol, prior to rehydrating the muscle in a heme or fat/heme solution.
11. Wicking a heme or fat/heme solution into the muscle using capillary-force driven fluid exchange.
12. Forcing the heme or fat/heme solution into the muscle using centrifugal forces.
13. Electric field electroporation followed by soaking or infusion of the heme or fat/heme solution.
14. Electrophoresis driven penetration of the heme or fat/heme solution into the muscle between two flat electrodes.
15. Ballistic delivery of dried heme and/or heme/fat particles into the muscle.
16. Infusion of the heme or fat/heme solution directly through the extant veins, arteries and/or lymph vessels of the muscle.
17. Lowering the pH of the muscle tissue or the heme or fat/heme solution to below 7, or in an embodiment below 5.4 to open up the fiber structure of the muscle tissue and reduce the water binding capacity of the muscle proteins before introduction of the heme or fat/heme solution.
18. Leaving the extant blood in the tissue after slaughter instead of bleeding the animal.
19. Compressing the muscle tissue like a sponge via differential pressure in the presence of the heme or fat/heme solution and then letting the muscle soak up the surrounding solution after pressure is relieved. In an embodiment, the differential pressure is a vacuum which can apply up to 15 pounds per square inch (psi) differential pressure on the muscle tissue. In another embodiment, the pressure differential is created using positive pressure which can exceed 15 psi.
20. Slicing the muscle tissue that is at least 30 mm overall thickness into thin sections that are in the range of about 1 mm to about 10 mm in thick to increase surface area for diffusion of the heme or fat/heme solution into the muscle tissue of the white meat. In another embodiment, the sliced muscle tissue sections is bound together using the adhesion effects of the added hemoglobin or whole blood, or with binders such as fat or cold set binders such as Fibrimex™ of Sonac B.V. Corporation, The Netherlands, as a restructured meat product. A cold set binding agent relies on the physiological clot forming action of the plasma proteins fibrinogen and thrombin. Other commonly used cold set binders comprise, for example, egg albumin, transglutaminase obtained from microbial sources, and alginate, that is, a polysaccharide that works in combination with a divalent cation.

21. One or more freeze and thaw cycles of the meat will cause physical disruption caused by ice crystals formed in the meat that will allow for easier removal of the native water from the muscle and/or introduction of the heme or fat/heme solution into the muscle of the hybrid meat product.
22. Air drying the muscle and then rehydrating in a heme or fat/heme solution.
23. Tumbling the muscle tissue in a rotary tumbler at atmospheric or reduce air pressure in the presence of heme or fat/heme solution to uniformly distribute the heme or fat/heme in the tissue.
24. Mechanical vibration of at least 1 mm amplitude and 2 kilohertz (KHz) frequency to uniformly distribute the heme or fat/heme in the tissue.
25. High pressure pulses such as those used for hydrodynamic tenderization to introduce the heme or fat/heme into the tissue.

Due to the lipid nature of the fat/heme emulsion, the fat/heme emulsion may distribute more effectively in the intramyocellular lipid content in a skeletal muscle and the hydrophobic intercellular spaces of the muscle tissues, relative to the heme solution alone. The above tendency can serve to increase the desired intramuscular lipid content of the hybrid meat product.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above disclosure, illustrate the invention in a non-limiting fashion.

Example 1: Beef-Like Hybrid Meat Product in the Form of a Muscle Cut

A hybrid meat product in the form of a full chicken breast was created using a skinless boneless chicken breast weighing approximately 140 grams as a starting point. The chicken breast was made to match the color, taste, and texture of a beef tenderloin steak cut. Lean tenderloin steak has an average intramuscular lipid content of approximately 6%, whereas chicken breast has a fat content of approximately 2%. Most of the flavor difference between lean chicken white meat and beef steak originate from the differences in the level and species-specific composition of fat content between the two species. Therefore, the method disclosed below augments the lipid content of chicken breast from approximately 2% to approximately 6% via addition of beef fat to maximize the beef flavor. Furthermore, the method disclosed below augments the heme iron content of skinless boneless chicken breast from approximately 2 micrograms/gram of chicken meat to the levels found in tenderloin of 10 micrograms/gram of meat, and also matches the meat color of the hybrid meat product to that of beef. Table 7 below shows the component modification required to turn chicken breast into a hybrid meat product equivalent to beef tenderloin.

TABLE 7

Comparison between chicken breast and beef tenderloin and the components required to create a hybrid meat product.

| Per 100 grams | Fat content | Beef fat (g) | Heme iron (micrograms) |
| --- | --- | --- | --- |
| Chicken breast | 2% | 2 | 200 |
| Beef tenderloin | 6% | 6 | 1000 |
| Added to create hybrid meat product | | 4 | 800 |

While hemoglobin and beef fat can be introduced separately into the hybrid meat product, it is beneficial in high volume production to combine the two steps into a mixture of a liquid or soft solid, for example, the consistency of beef tallow or butter, and that is introduced into the hybrid meat product in a single injection step. A homogenized mixture of beef fat or tallow was emulsified in diluted hemoglobin solution in the following manner. An anticoagulant of 0.2% (wt/wt) sodium citrate was added to freshly collected bovine blood which was then centrifuged at 1200 g-force for 10 minutes. The erythrocytes settled at the bottom half of the blood container and were extracted. The erythrocytes were then blended for 1 minute in a household blender to rupture or hemolyze the red blood cell membranes and release the free hemoglobin. Hemoglobin is much more amenable to diffuse into intracellular and intercellular spaces of white skeletal muscle relative to whole red blood cells that measure around 7 micron in diameter. The hemoglobin solution was diluted to 25% with water, that is, 1 part hemoglobin to 3 parts water. If the hemoglobin solution were not to be diluted, too much iron would be introduced into the hybrid meat product when injecting a hemoglobin/fat mixture at a volume sufficient to achieve the appropriate fat levels.

Beef tallow was added and homogenized into this diluted hemoglobin solution to give an injection solution with 30% fat content and 0.16 mg iron per milliliter of solution. During the homogenization process, the beef fat particles were reduced in size to less than 1 micron in diameter. For every 100 grams of chicken, 13 ml of this injection solution will create a hybrid meat product containing a total of 6% fat, 67% of which comes from beef, and 2.5 mg of iron, 84% of which comes from a bovine source. The hemoglobin injection converts the tan color of the raw chicken meat to the red color of raw beef.

Approximately 18 milliliters (ml) of the injection solution above was injected into the 140 gram chicken breast using a 23 gage needle at a density of one injection per 9 $mm^2$. A lower injection density of one injection every 25 $mm^2$ caused for some of the chicken white meat to not be colored red as intended since the average diffusion distance between injections is approximately 5 mm to 7 mm and hemoglobin does not diffuse such distances efficiently. A higher injection density of one injection per 2 $mm^2$ caused for most of the injected liquid to escape. The ideal injection density is therefore one injection every 2 mm² to 25 mm² of meat surface, or in an embodiment, one injection every 4 to 15 mm² of meat surface. The surface area of the chicken breast was roughly 3,500 mm² when placed on a flat surface. Therefore, 390 injections were required per piece of chicken breast with the ideal volume ranging of 0.02 to 0.12 ml. per injection site. The injection solution was injected continuously during the penetration and withdrawal of the needle.

The addition of beef tallow added the distinct beef flavor to the chicken meat, provided increased meat tenderness due to bulk density and lubrication effects. The fat deposits were fine enough to not be visible in the meat as visible marbling was not the intended effect of this process. Rather the fat was spread as uniformly as possible in the hybrid meat product to simulate the intramuscular fat distribution in tenderloin.

The injection sites immediately after injection were clearly visible due to the high concentration of red hemoglobin around the needle penetration site. Therefore, after injection, the hybrid meat product was incubated for 4 hours at 4 degrees Celsius to enable diffusion of the iron and fat into the muscle tissue uniformly. The uncooked hybrid meat product resembles in color a piece of raw beef steak. There is uniform distribution of red heme iron color, and no injection sites are visible after the hemoglobin diffusion step.

The hybrid meat product in the form of a chicken breast was cooked to 165 degree F. and resembles cooked beef steak. When cut in half, the cross-section showed uniform beef-like color throughout its interior due to successful diffusion of the hemoglobin in the beef-like hybrid meat product.

A Warner-Bratzler shear force analysis was conducted on the cooked control chicken breast with a resulting score of 3 kilograms (kg). A Warner-Bratzler shear force analysis was conducted on the beef-like hybrid meat product with a resulting score of 2.5 kg. Therefore, the method disclosed above increased the tenderness of the hybrid meat product by more than 15% relative to the control meat product. A tasting panel confirmed that the taste, smell, color, texture and tenderness of hybrid meat product were indistinguishable from beef tenderloin.

Example 2: Beef-Like Hybrid Meat Product in the Form of a Patty

Fresh whole bovine blood was blended for 1 minute in a household blender to rupture the red blood cell membranes and release the hemoglobin, which is approximately 95% of the dry weight content of erythrocytes. The free hemoglobin has a molecular weight of 64,500 daltons, which makes these molecules much more amenable to diffuse into intracellular and intercellular spaces of white skeletal muscle relative to whole red blood cells that measure around 7 micron in diameter and contain approximately 250 million molecules of hemoglobin each.

Boneless and skinless chicken thigh meat with 4% fat was ground in a meat grinder using ¼" diameter openings corresponding to poultry meat 20 after coarse grind 12 in FIG. 1. 630 grams of this ground chicken thigh meat was combined with blended whole beef blood corresponding to heme iron 21 in FIG. 1 to make a chicken thigh meat mixture with a heme iron concentration of 10 micrograms/gram. The chicken meat/heme iron mixture was incubated for 4 hours at 4 degrees Celsius corresponding to poultry meat/heme iron mixture 22 in FIG. 1.

Chunks of beef containing approximately 50% lean and 50% fat was ground using a meat grinder with ¼" diameter openings corresponding to bovine fat 10 in FIG. 1.

370 grams of ground bovine fat 10 was mixed together with the 630 grams of poultry meat/heme iron mixture 22. The combined mixture was then ground using a meat grinder with ⅛" diameter openings corresponding to fine grind 16, thus forming beef-like hybrid meat product 30 in FIG. 1. The hybrid meat product of this example was totally indistinguishable in look, aroma and taste from 80% lean ground beef when raw, during and after cooking.

The nutritional and environmental impact characteristics of beef-like hybrid meat product 30 are compared to 80% lean ground beef in Table 8 below. The comparison of the hybrid meat product is obtained by multiplying the nutritional values or environmental impact figures of beef and chicken as indicated in Table 1 by their relative weights in the hybrid meat product. The nutritional values of hybrid meat product, namely, caloric, protein and iron content, are within +/−10% of the beef product.

TABLE 8

A comparison of nutritional and environmental impact values of the hybrid meat product relative to ground beef.

| Per 100 grams | Ground 80% lean beef | Hybrid Meat Product 30 of example 2 | Comparison |
|---|---|---|---|
| Energy (kcal) | 254 | 247 | 97% |
| Protein (g) | 17 | 16 | 93% |
| Iron (mg) | 2 | 2 | 100% |
| Fat (g) | 20 | 20 | 100% |
| Land required (sq. ft.) | 389 | 151 | 39% |
| Animal feed (kcal) | 9,050 | 4,823 | 53% |
| Water to grow (gallons) | 109 | 47 | 43% |
| CO2 produced (kilos) | 2.5 | 1.3 | 50% |

The source of the various components that are responsible for taste, look, and nutritional value of the beef-like hybrid meat product 30 are given in Table 9 below.

TABLE 9

Source of the various components of the hybrid meat product 30 in example 2.

| Content | Chicken contribution | Beef contribution | Added heme iron contribution |
|---|---|---|---|
| Protein | 73% | 27% | 0% |
| Total lipid (fat) | 15% | 85% | 0% |
| Iron, Fe | 20% | 25% | 55% |

Pure chicken protein and pure beef protein are fairly indistinguishable in terms of nutritional value, taste, and texture. Therefore, the result of the method disclosed in this example produces a hybrid meat product in which 73% of the protein content of the beef-like hybrid meat product 30 comes from chicken as opposed to the high environmental impact beef proteins.

The method in this example provides a hybrid meat product that is equivalent and, in some aspects, superior to beef as far as essential amino acid content, even though only 27% of the protein content of the beef-like hybrid meat product 30 originates in beef.

On the other hand, 85% of the fat content of beef-like hybrid meat product 30 comes from byproduct beef trimmings, which is the main component of beef taste. The source of iron is fairly evenly split between the added heme iron and the native heme iron present in the chicken and beef. Therefore, the added hemoglobin is more responsible for the matching of the red color of beef-like hybrid meat product 30 to the color of beef, and less responsible for matching the taste of the beef-like hybrid meat product 30 to the taste of beef. The matching of taste is due primarily to incorporating a ratio of chicken fat to beef fat of 1:5 or less in beef-like hybrid meat product 30.

The cooking yield of a meat product is defined as 100* (cooked weight/raw weight). The hybrid meat product and 80% lean beef patty were cooked on the same surface at the same temperature for the same amount of time. The cooking yield of the hybrid meat product produced in this example was 83% whereas the cooking yield of the 80% lean beef patty was only 70%. This is a counter intuitive result as the United States Department of Agriculture (USDA) data of cooking yields (USDA Table of cooking yields for meat and poultry, December 2012) indicates cooking yields of 72% for chicken white meat and 69% for ground beef. Therefore, an unexpected result is that the mixture of lean chicken, fatty beef, and added heme iron created a hybrid meat product with a cooking yield above 80%. The higher the cooking yield, the juicier, tastier, and more economical the meat product is.

As used herein, the terms "about", "around", or "approximately" refer to +/−20%.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for producing a meat product, said method comprising:
   (a) providing a bovine meat source and coarsely or finely grinding the bovine meat source to produce a ground bovine meat;
   (b) providing a poultry meat source and coarsely or finely grinding the poultry meat source to produce a ground poultry meat;
   (c) providing a recombinant heme iron;
   (d) mixing the ground bovine meat, the ground poultry meat, and the recombinant heme iron; wherein:
      a protein from said bovine meat source is 30% or less of the total weight of the meat product;
      a fat from said bovine meat source is in the range of 10-30% of the total weight of the meat product;
      a fat from said poultry meat source is 5% or less of the total weight of the meat product; and
      said recombinant heme iron is from 3 micrograms per gram of the meat product to 20 micrograms per gram of the meat product.

2. The method of claim 1, wherein a ratio of fat from said poultry meat source to said fat from said bovine meat source is less than 1:5.

3. The method of claim 2, wherein a ratio of protein from said bovine meat source to protein from said poultry meat source is less than 1:2.

4. The method of claim 3, wherein a concentration of said recombinant heme iron is in a range of about 5 micrograms per gram to about 15 micrograms per gram of said meat product.

5. The method of claim 1, wherein the recombinant heme iron is in a range from about 5 micrograms to about 10 micrograms per gram of said meat product.

6. The method of claim 1, wherein when cooked, a taste and an aroma of the meat product is comparable to a taste and an aroma of a beef meat cooked the same way as the meat product.

7. The method of claim 1, The method of claim 1, wherein the poultry meat source is chicken meat.

8. The method of claim 7, wherein the bovine meat source is beef.

9. The method of claim 1, wherein the meat product consists essentially of chicken meat, beef meat comprising beef fat, and the recombinant heme iron.

10. The method of claim 1, wherein the meat product is a ground meat product.

11. The method of claim 1, wherein a total concentration of iron in the meat product is from about 1 milligram per 100 grams of the meat product to about 4 milligrams per 100 grams of the meat product.

12. The method of claim 1, further comprising cooking the meat product, wherein a taste of the cooked food product is comparable to a taste of a control cooked food product, wherein the control cooked food product is prepared similarly but comprises only of beef.

* * * * *